US007400287B2

(12) United States Patent
Saccomanno

(10) Patent No.: US 7,400,287 B2

(45) Date of Patent: Jul. 15, 2008

(54) SMART CHAFF

(75) Inventor: Robert J. Saccomanno, Montville, NJ (US)

(73) Assignee: Honeywell International Inc., Morristown, NJ (US)

( * ) Notice: Subject to any disclaimer, the term of this patent is extended or adjusted under 35 U.S.C. 154(b) by 31 days.

(21) Appl. No.: 11/356,153

(22) Filed: Feb. 17, 2006

(65) Prior Publication Data

US 2008/0143579 A1 Jun. 19, 2008

(51) Int. Cl.

| | |
|---|---|
| ***H04K 3/00*** | (2006.01) |
| ***G01S 7/495*** | (2006.01) |
| *G01S 13/00* | (2006.01) |
| *G01S 17/00* | (2006.01) |

(52) U.S. Cl. .............................. 342/12; 342/5; 342/13; 342/14; 342/175; 244/3.1; 89/1.11

(58) Field of Classification Search ........... 244/3.1-3.3; 455/1; 342/1-19, 175; 89/1.11; 102/501, 102/504, 505

See application file for complete search history.

(56) References Cited

U.S. PATENT DOCUMENTS

| | | | | |
|---|---|---|---|---|
| 2,869,120 | A * | 1/1959 | Lolmaugh et al. | 342/9 |
| 3,086,202 | A * | 4/1963 | Hopper et al. | 342/9 |
| 3,137,231 | A * | 6/1964 | Johnson | 342/12 |
| 3,143,965 | A * | 8/1964 | La Pointe | 342/12 |
| 3,150,848 | A * | 9/1964 | Lager | 244/3.16 |
| 3,339,201 | A * | 8/1967 | Fischer et al. | 342/14 |
| 3,795,918 | A | 3/1974 | Sunderland | |
| 3,836,968 | A * | 9/1974 | Schillreff | 342/12 |
| 4,073,516 | A | 2/1978 | Kling | |
| 4,124,182 | A | 11/1978 | Loeb | |
| 4,149,166 | A * | 4/1979 | Null | 342/13 |
| 4,438,598 | A | 3/1984 | Wohlmuth | |
| 4,477,040 | A | 10/1984 | Karanik | |
| 4,696,443 | A | 9/1987 | Zacharin | |
| 4,808,999 | A * | 2/1989 | Toman | 342/15 |
| 5,134,518 | A | 7/1992 | Letter | |
| 5,136,295 | A * | 8/1992 | Bull et al. | 342/15 |
| 5,437,578 | A | 8/1995 | Wasserberger et al. | |
| 5,620,791 | A | 4/1997 | Dwivedi et al. | |
| 5,703,314 | A * | 12/1997 | Meeker | 89/1.11 |
| 5,786,786 | A * | 7/1998 | Small | 342/13 |

(Continued)

OTHER PUBLICATIONS

Srinath S. Heragu et al., *Generalized Model for Infrared Perception from an Engine Exhaust*, Journal of Thermophysics and Heat Transfer, vol. 16, No. 1, Jan.-Mar. 2002, pp. 68-76.

(Continued)

*Primary Examiner*—Bernarr E Gregory
(74) *Attorney, Agent, or Firm*—McDonnell Boehnen Hulbert & Berghoff LLP

(57) ABSTRACT

Missile deflector systems for protecting a vehicle from threats that use an infrared sensor for guidance are disclosed. An exemplary missile deflector system can include, for example, a radiation source and one or more deployable smart chaff elements. The light source and the one or more deployable smart chaff elements can direct the threat, such as, for example, a missile, away from the vehicle or, in other embodiments, disable the threat. Another exemplary missile deflector system can include, for example, a smart chaff element with a near-infrared emitter and a plurality of transmitting fibers to transmit the near-infrared radiation out of the smart chaff element.

24 Claims, 6 Drawing Sheets

U.S. PATENT DOCUMENTS

| | | | | |
|---|---|---|---|---|
| 6,265,071 | B1 | 7/2001 | Gross et al. | |
| 6,359,710 | B1 | 3/2002 | Takken et al. | |
| 6,384,765 | B1 * | 5/2002 | Sjostrand et al. | 342/15 |
| 6,417,518 | B2 | 7/2002 | Arakawa et al. | |
| 6,420,720 | B1 | 7/2002 | Rubin | |
| 6,662,700 | B2 | 12/2003 | O'Neill | |
| 6,738,012 | B1 | 5/2004 | Kirkpatrick | |
| 6,750,558 | B1 | 6/2004 | Bruhwiler | |
| 6,804,495 | B2 * | 10/2004 | Duthie | 244/3.1 |
| 6,825,791 | B2 | 11/2004 | Sanders et al. | |
| 6,939,253 | B2 | 9/2005 | Ogg | |
| 6,980,152 | B2 * | 12/2005 | Steadman et al. | 342/14 |
| 2002/0145554 | A1 * | 10/2002 | Lloyd et al. | 342/13 |
| 2005/0062638 | A1 * | 3/2005 | Zeineh | 342/13 |
| 2005/0134496 | A1 * | 6/2005 | Trainor | 342/14 |

OTHER PUBLICATIONS

R. Decher, *Infrared Emissions from Turbofans with High Aspect Ratio Nozzles*, J. Aircraft, vol. 18, No. 12, Dec. 1981, pp. 1025-1031.

G.D. Power et al., *Advanced IR Suppressor Design Using A Combined CFD/Test Approach*, AIAA-94-3215, 30th AIAA/ASME/SAE/ASEE Joint Propulsion Conference, Jun. 27-29, 1994, Indianapolis, IN, pp. 1-9.

* cited by examiner

SMART CHAFF

DESCRIPTION OF THE INVENTION

1. Field of the Invention

The present invention generally relates to apparatus for protecting vehicles from guided threats and, more particularly, relates to smart chaff apparatus for protecting vehicles from guided threats.

2. Background of the Invention

Infrared guided missiles can be a threat to all vehicles that emit infrared radiation, such as, airplanes, helicopters, and ground vehicles. Stinger missiles, for example, are shoulder-fired, heat seeking missiles that are relatively inexpensive and easy to acquire. Moreover, infrared guided missiles are relatively easy to operate. The operator aims at a target to allow the infrared sensor to lock onto an engine or other heat source, and fires. The infrared guided missiles generally include a computerized navigational system that guides the missile to the target.

Conventional countermeasures for protecting against infrared guided missiles include deployment of flares or other infrared sources to draw the missile away from the vehicle. Problems with conventional countermeasures can arise due to the inherent danger of accidental ignition of flares. Also, more sophisticated missiles may be able to distinguish the sun, flares or other infrared sources from the target vehicle.

Thus, there is a need to overcome these and other problems with the prior art and to provide methods and apparatus to protect vehicles that emit infrared radiation from missiles that use infrared sensors and guidance systems.

SUMMARY OF THE INVENTION

According to various embodiments, a missile deflector system for use on a vehicle is provided. The missile deflector system can include a light source attached to the vehicle, wherein the light source is configured to emit ultraviolet light in a direction coincident with at least a portion of an infrared radiation emitted by the vehicle. The missile deflector system can further include a deployable smart chaff element including at least one infrared light source whose spectral emittance can be detectable by a missile, an infrared light source driver, an energy storage element, a controller, at least a partially infrared-transmissive aerodynamic structure surrounding the infrared light source, and at least one aerodynamic feature for stabilization.

According to various embodiments, another missile deflector system for use on a vehicle is provided. The missile deflector system can include an ultraviolet light source disposed on the vehicle, wherein the ultraviolet light source is configured to emit light in a direction coincident with a portion of the infrared radiation emitted by the vehicle. The missile deflector system can further include an infrared light source disposed within the vehicle, a deployable optical conduit having a first end configured to couple light from the infrared light source and an optical element disposed at a second end of the optical conduit, wherein the optical element emits light to draw-in the missile to strike a point at a safe-distance from the vehicle.

According to various other embodiments, another missile deflector system for use on a vehicle is provided. The missile deflector system can include a housing comprising aerodynamic features, a near-infrared emitter disposed within the housing, and a plurality of transmitting fibers, wherein a first end of the transmitting fibers are disposed to transmit an infrared radiation away from the near-infrared emitter. The missile deflector system can also include an insulating material disposed around the near-infrared emitter.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE EMBODIMENTS

Reference will now be made in detail to various embodiments of the invention, examples of which are illustrated in the accompanying drawings. Wherever possible, the same reference numbers will be used throughout the drawings to refer to the same or like parts.

FIGS. 1-6 depict exemplary missile deflector systems for protecting a vehicle from threats that use an infrared sensor for guidance. The exemplary missile deflector systems can include a light source and one or more deployable smart chaff elements. The light source and the one or more deployable smart chaff elements can direct the threat, such as, for example, a missile, away from the vehicle or, in other embodiments, disable the threat.

As used herein, the term "radiation" is used interchangeably with the term "light." For example the terms infrared radiation is used interchangeably with the term infrared light.

Figure 1:
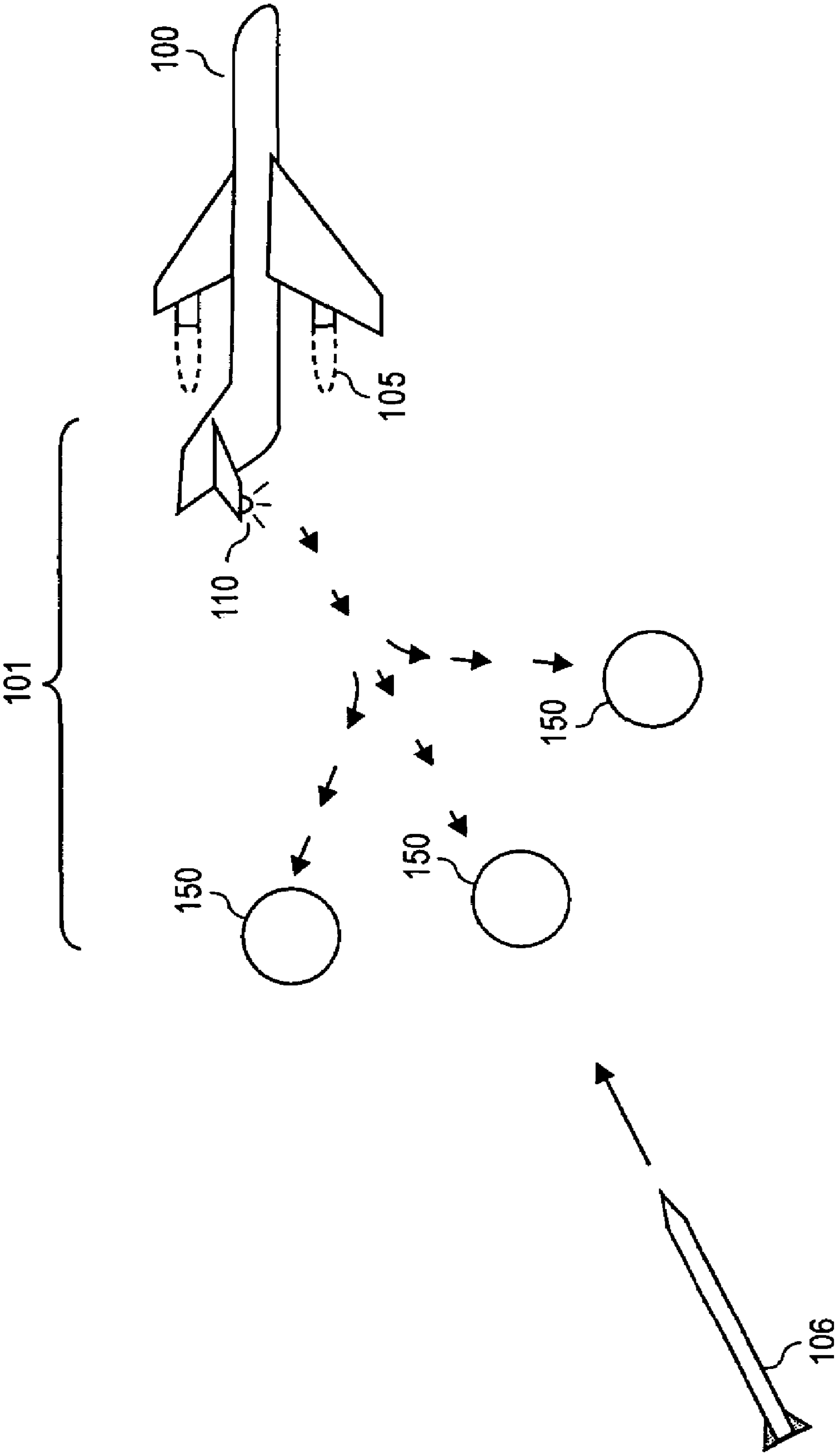
FIG. 1 illustrates an exemplary missile deflector system in accordance with the present teachings.

Referring to FIG. 1, an exemplary missile deflection system for protecting a vehicle 100 from a missile 106 is depicted. Missile 106 can be an infrared guided missile. Vehicle 100 can be any vehicle that emits infrared radiation. Although vehicle 100 is depicted as an airplane in FIG. 1, one of skill in the art will understand that vehicle 100 can be a helicopter, a ground vehicle or other commercial or military vehicle. Vehicle 100 can emit infrared radiation from several sources including the surface of vehicle 100 and the engine exhaust 105. A missile deflection system 101 can include a light source 110 attached to vehicle 100 and one or more deployable smart chaff elements 150.

Light source 110 can be configured to emit light in a direction coincident with at least a portion of an infrared radiation emitted by vehicle 100, thereby emulating sunlight for those missiles programmed to avoid sunlight, such as the US Stinger or the Russian SA-16 and SA-18. For example, on the aircraft depicted in FIG. 1, light source 110 can be positioned on the tailfin of the aircraft to emit light coincident with emissions from the jet engines. In various other embodiments, light sources 110 can be attached to the engine cowling, positioned under the wings and/or the under surface of vehicle 100. In various embodiments, light source 110 can emit ultraviolet (UV) light. Examples of UV light sources include, but are not limited to xenon lamps, deuterium lamps, mercury vapor lamps, lasers, and LEDs.

Some missiles, like the Stinger, have infrared seeking systems capable of distinguishing jet exhaust from sunlight by sensing the amount of UV radiation. Typically, the UV radiation from sunlight and the surrounding sky is much greater than that from a jet exhaust and an aircraft frame. By employing light source 110 to emit UV light, detection of vehicle 100 by missile 106 becomes more difficult.

Figure 2:
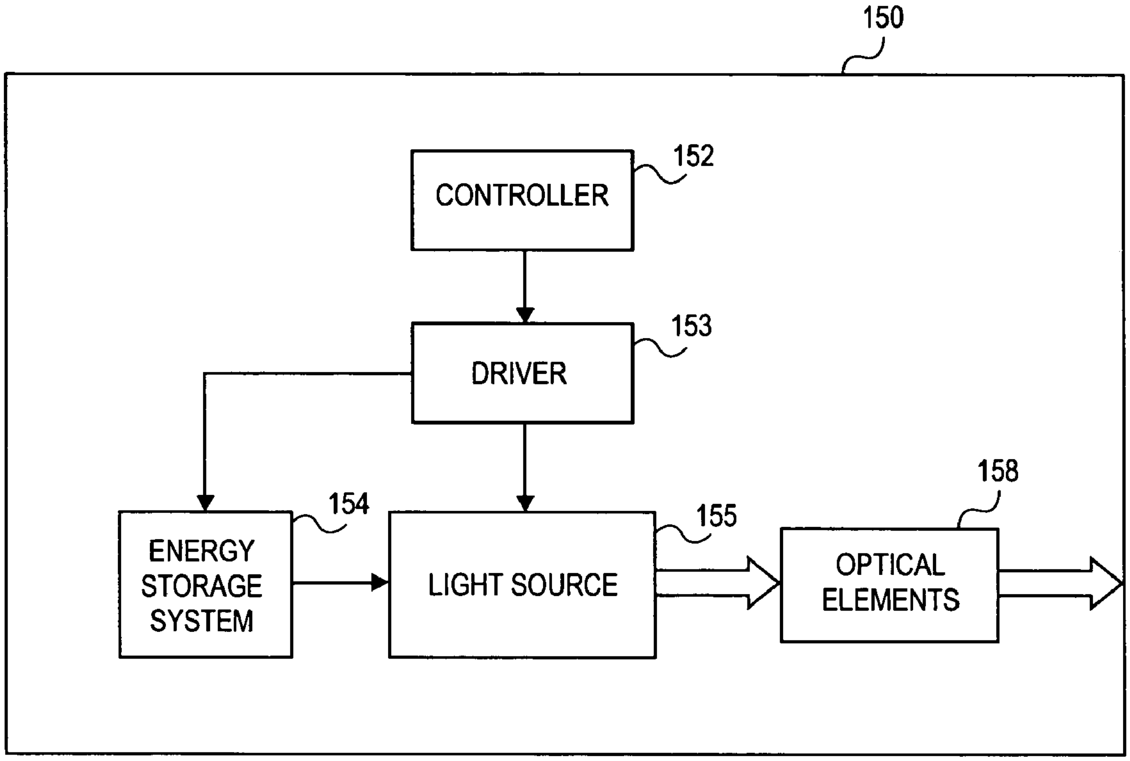
FIG. 2 depicts a block diagram of a smart chaff element in accordance with the present teachings.

Referring to FIG. 2, deployable smart chaff element 150 is depicted. Deployable smart chaff element 150 can include a controller 152, a driver 153, an energy storage element 154, at least one infrared light source 155, and optical elements 158. Controller 152 can control driver 153, for example, to pulse the at least one infrared light source 155 for maximum intensity. Energy storage element 154 can be, for example, a battery. Other examples of energy storage element 154 can include, but are not limited to, super capacitors and electromechanical storage devices that convert the airflow around the deployable smart chaff element 150. In various embodiments, energy storage element 154 can be charged when deployed. Energy storage element 154 can provide the power for light source 155. Light source 155 can be one or more infrared light sources, such as, for example, a xenon arc lamp and/or semiconductor emitters such as laser diodes and LEDs. In various embodiments emissions from smart chaff element 150 can cover wavelengths from about 2-6 microns.

In various embodiments, light source 155 can also be one or more high temperature electrical heaters with low thermal mass (e.g., available from Thermal Circuits, Inc, Salem, Mass.) to rapidly achieve the desired emissions or mechanical/friction heaters (e.g. brake pads/rotors such as in U.S. Pat. Nos. 5,620,791 and 6,265,071) to generate temperatures in the range of 200° C. to 600° C., which correspond to black body emissions in the 2-6 micron range. Appropriate thermal isolation can also be used so that the cooling effects of the cold moving air do not prevent smart chaff 150 from reaching the appropriate emission temperature. As is known in the art, a closed-loop temperature control system can be deployed, monitoring surface temperatures (e.g. U.S. Pat. No. 4,438,598) and/or emission spectra (U.S. Pat. No. 3,795,918). These types of deployable elements can, for example, only be activated upon deployment, thereby posing no hazard when stored in vehicle 100 prior to deployment.

In various embodiments, deployable smart chaff element 150 can also include optical elements 158. Optical elements can include, but are not limited to, one or more lenses, prisms, waveguides, reflectors, filters, gratings, optical fibers, and mirrors. Optical elements 158 can be used can be used in conjunction with the infrared light emitted by light source 155 to emulate what missile 106 is programmed to look for. For example, a filter can be used to shape the emission spectra of the infrared source to emulate that of a jet engine (peaks at 2.7, 4.3 and 5.8 microns as disclosed in *Generalized Model for Infrared Perception from an Engine Exhaust*, S. Heragu et al., Journal of Thermophysics and Heat Transfer, Vol 16, No 1, January-March 2002). A reflector can be used to maximize the amount of infrared emissions in the direction of the threat. The smart chaff element can also disperse infrared absorbing materials to attenuate the infrared emissions from the aircraft engines. For example, a filter can be used to shape the emission spectra of the infrared source to emulate that of a jet engine. A reflector can be used to maximize the amount of infrared emissions in the direction of the threat. The chaff element can also disperse infrared abosrbing materials to attenuate the infrared emissions from the aircraft engines.

Figure 3:
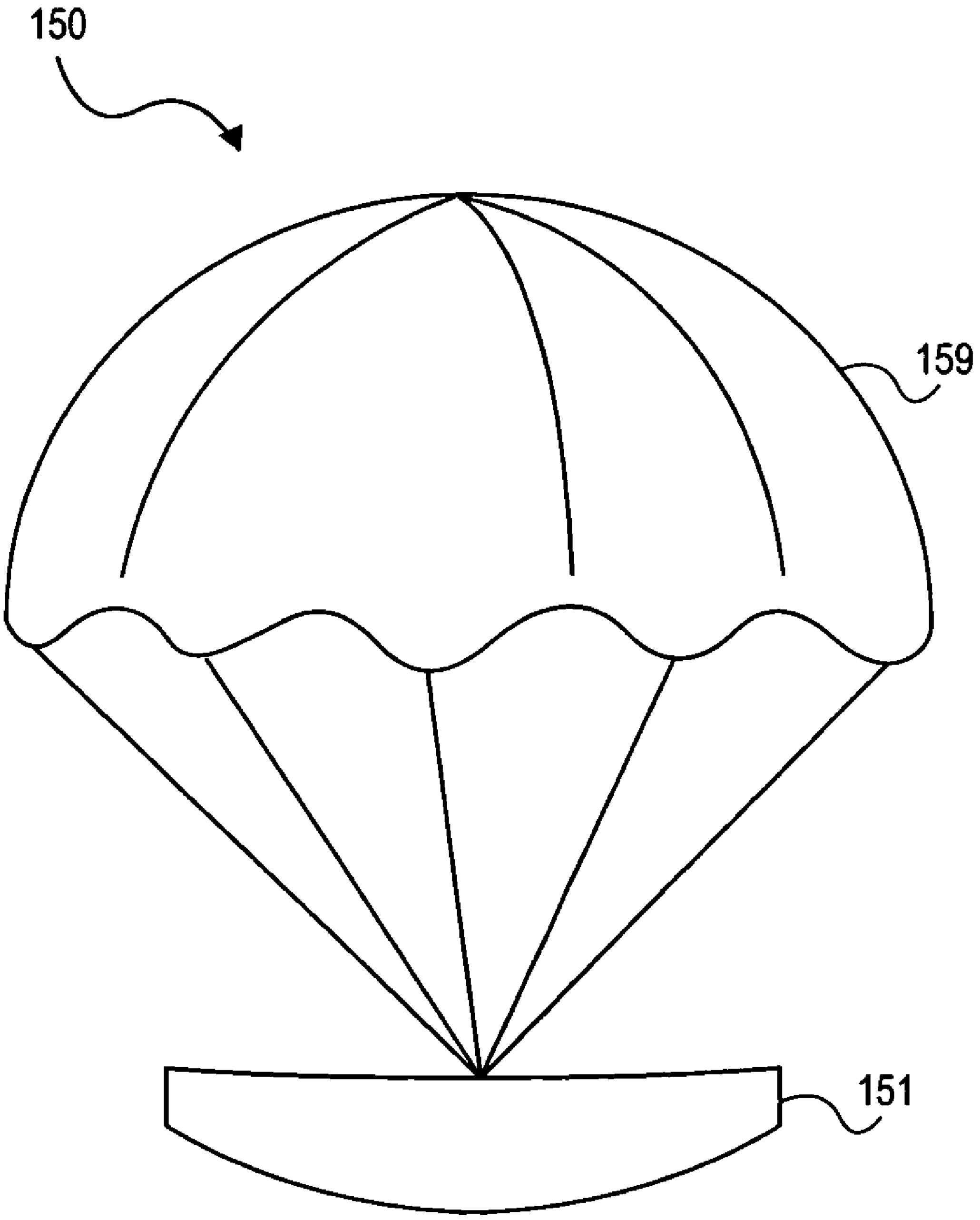
FIG. 3 depicts a block diagram of another smart chaff element in accordance with the present teachings.

In various embodiments, smart chaff element 150 can be housed in an aerodynamic structure that has a high infrared signature and a low UV signature. Referring to FIG. 3, aerodynamic structure 151 of smart chaff element 150 can be formed of a material that is partially transmissive to infrared radiation, such as those used in missile seeker domes (i.e. Spinel, Sapphire, ALON, all referenced in U.S. Pat. No. 5,134,518). Smart chaff element 150 can further include one or more aerodynamic features for stabilization. FIG. 3 depicts an aerodynamic feature 159 such as a parachute (also referred to herein as a "chute"). Other aerodynamic features can include, but are not limited to a fin and a spinning feature. Spinning features can be traditional blade-type elements, or even surface dimple patterns, such as those found on the new generation of sophisticated golf balls (e.g., see U.S. Pat. No. 6,939,253). Aerodynamic features 159 can function to keep smart chaff element 150 within the field of view of the missile sensor for a longer period time to draw missile 106 from vehicle 100. Such aerodynamic features can be optimized using computational fluid dynamic software; e.g. available from Fluent, Inc. (Lebanon, N.H.).

In operation, missile 106 is fired at vehicle 100. Upon detection of missile 106, missile deflection system 101 can be activated. In various embodiments, the missile deflection system 101 can include a sensor (not shown) on vehicle 100, to detect missile 106. The sensor can be configured to detect a wide range of missile characteristics including, but not limited to, radar reflections, laser reflections, and radio frequency emissions. Once missile 106 is detected, light source 110 can be activated and smart chaff 150 can be deployed.

Light source 110 can emit UV radiation coincident with at least a portion of the UV radiation emanating from vehicle 100. The UV radiation from light source 110 can make it more difficult to distinguish vehicle 100 from background UV radiation in the sky and/or from sunlight.

Smart chaff element 150 can then be used to direct missile 106 away from vehicle 100. Prior to deployment, energy storage system 154 can be charged. Once deployed, controller 152 can control driver 153 to drive light source 155, for example, in a pulsed manner. In an embodiment, controller 152 can be pre-programmed to excite driver 153 in a desired manner, such as, for example, in a manner to spatially modulate emitted infrared radiation. Optical elements 158, powered by energy storage system 154, can then direct the radiation from light source 155 to, for example, emulate an infrared radiation signature sought by missile 106. In other exemplary embodiments, optical elements 158 can modify at least one of an intensity, a relative spectral distribution, and a direction of an output of the at least one infrared light source. In still other embodiments, smart chaff element 158 can project an image to emulate a profile of vehicle 100 or to retroreflect an image of missile 106. In various embodiments, more than one smart chaff element 150 can be deployed to direct missile 106 away from vehicle 100.

Figure 4:
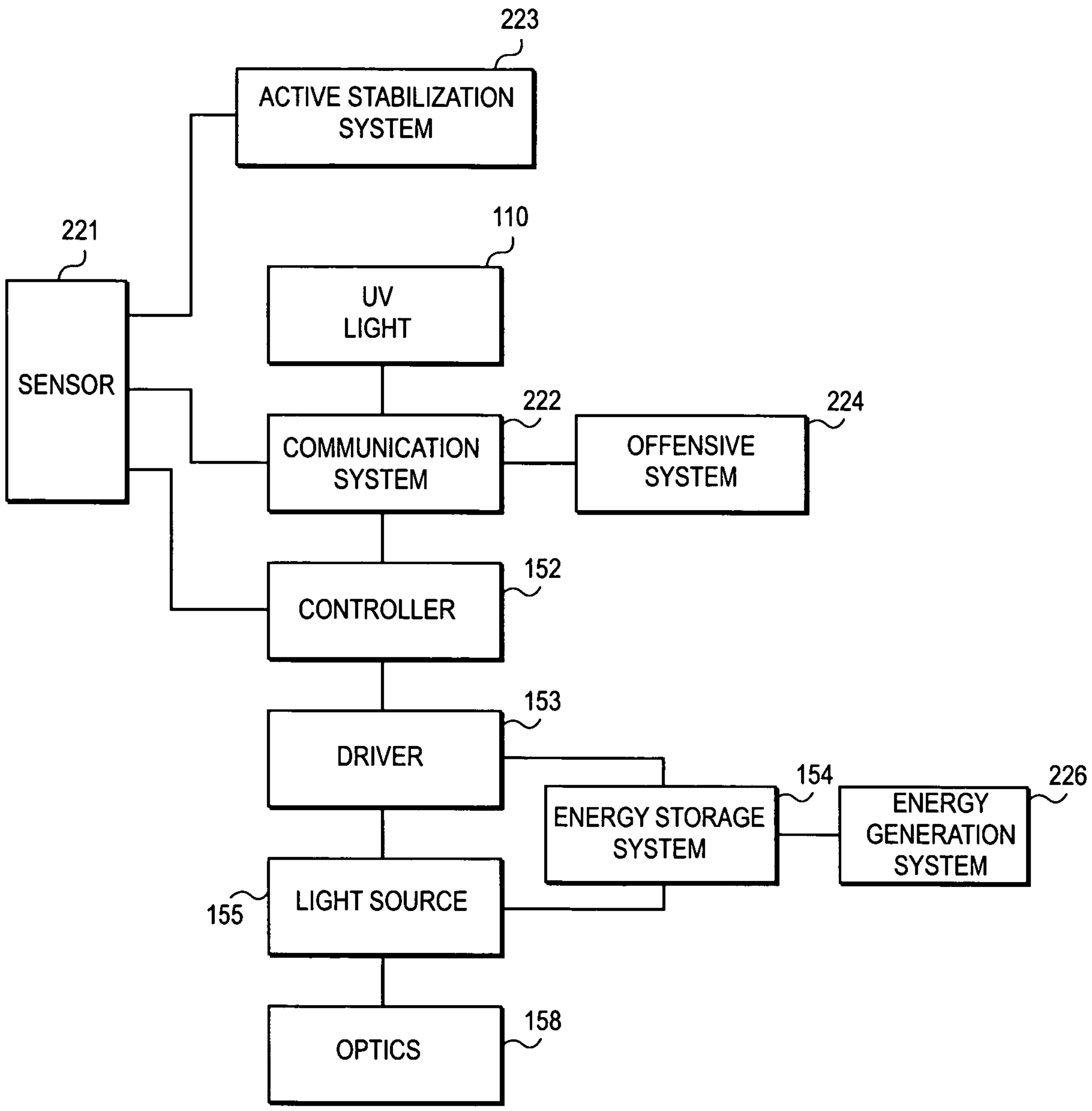
FIG. 4 illustrates an exemplary aerodynamic feature for a smart chaff element in accordance with the present teachings.

Referring to FIG. 4, smart chaff element 150 can further include a sensor 221 configured to detect a wide range of missile characteristics including, but not limited to, radar reflections, laser reflections, and radio frequency emissions.

Smart chaff element 150 can further include a communications system 222. Communications system 222 can be configured to coordinate the response of smart chaff elements 150. For example, in an embodiment in which a plurality of smart chaff elements 150 are deployed, communications system can be used to coordinate spatial modulation of the infrared radiation emitted by the plurality of light sources 155. Communications system 222 can also be used to transmit data from sensor 221 back to vehicle 100 or used to reposition a formation of smart chaff elements to emulate certain geometric features of vehicle 100. In one embodiment, a deployable decelerator can be triggered (see e.g., U.S. Pat. No. 4,696, 443).

In various embodiments, smart chaff element 150 can further include an active stabilization system 223. Active stabilization system can function to work in conjunction with aerodynamic feature 159 to keep smart chaff element within the field of view of the infrared sensor of missile 106. In various embodiments, active stabilization system 223 can receive data from sensor 221 and adjust to draw missile 106 away from vehicle 100. An inertial and/or GPS based system can also be used to steer a formation of smart chaff elements 1150 into a high concentration along the current/predicted flight-path of missile 106. In one embodiment, a spherical chaff element can be redirected by sliding an internal mass, causing the element to change its trajectory. Non-uniform mass distributions are well known to alter trajectory (U.S. Pat. No. 5,437,578).

In various embodiments, smart chaff element 150 can further include an offensive system 224. Offensive system 224 can be configured to, for example, disable the guidance system and/or sensors of missile 106. Use of offensive system can be controlled based on data from sensor 221 or from vehicle 100 via communications system 222. Examples of suitable offensive systems include, but are not limited to, fragmentation devices and devices for dispersing infrared absorbing particles to help mask the infrared signature from the engines.

In various embodiments, smart chaff elements can further include an energy generation system 226 that can, for example, convert kinetic energy to electrical energy. As shown in FIG. 4, energy generation system 226 can generate electrical energy that can be stored by energy storage system 154. In other embodiments, the electrical energy from energy generation system 226 can be fed directly to light source 155. An exemplary embodiment can comprise fan-blade elements that rotate in the airstream, whether for the generation of electricity or for pure mechanical motion (the latter for the case of a friction-based embodiments disclosed above). Methods of converting air movement into mechanical motion are know to one of ordinary skill in the art, example of which can be seen in U.S. Pat. Nos. 4,073,516; 4,124,182; 4,477, 040; 6,417,518; and 6,750,558.

Figure 5:
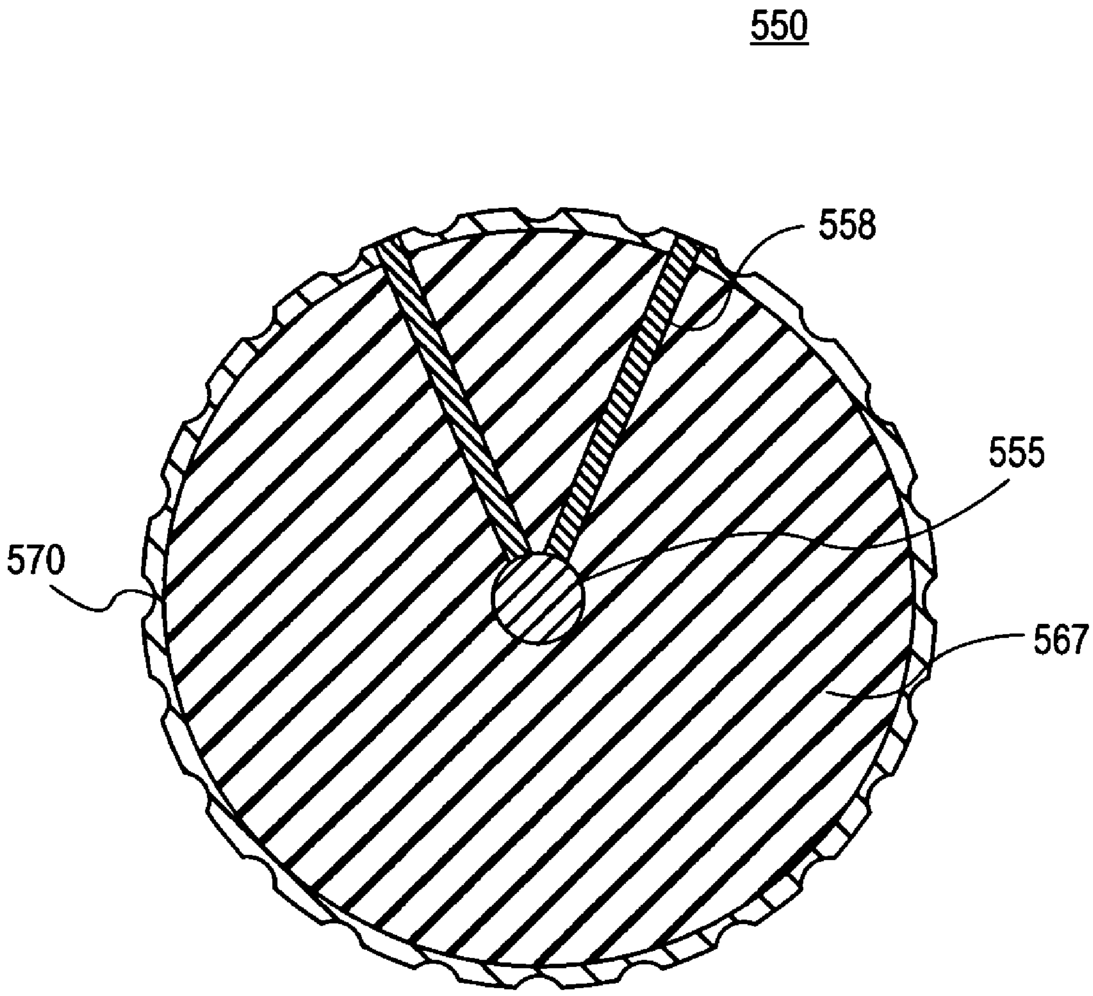
FIG. 5 illustrates another exemplary missile deflector system in accordance with the present teachings.

Another exemplary smart chaff element is shown in FIG. 5. Smart chaff element 550 can include a near-infrared emitter 555, a plurality of transmitting fibers 558, an insulating material 567, and a housing 570 that includes aerodynamic features. Near-infrared emitter 555 can be, for example, a thermal mass that charges up to a desired temperature via one or more of conduction, convection, and radiation. Charging can be aided by a conductive probe (not shown) connected to near-infrared emitter 555 and a heat source such as an electric heater or a heat exchanger within the engine of the vehicle. Insulating material 567 can surround near-infrared emitter 555 and allow near-infrared emitter to operate at the appropriate temperature while deployed. The static and transient thermal performance can be optimized, for example, in accordance with the general teachings in Cooling Techniques for Electronic Equipment, 2nd Ed, D. Steinberg, 1991, J. Wiley & Sons), along with analytical software tools such as TMG Thermal from MAYA Heat Transfer Technologies Ltd (Montreal, Canada). Insulating material 567 can also be hardened to withstand the environmental conditions, such as dirt accumulation and icing, during storage and operational use. In various embodiments, insulating material 567 is absorbing in the 2-6 micron range to obscure unwanted emissions during use.

Transmitting fibers 558 can be optical fibers coupled to near-infrared emitter 555 at one end. Transmitting fibers 558 pass though insulating material 567 to transmit infrared radiation from near-infrared emitter 555 to out of smart chaff element 550 at the second end of transmitting fiber 558. In various embodiments, smart chaff element 550 can further include an optical element, such as, for example, a lens, coupled to each second end of transmitting fibers 558. Although only two transmitting fibers are shown for ease of illustration, one of ordinary skill in the art will understand that more transmitting fibers can be use as desired. In various embodiments, transmitting fibers 558 can be doped to transmit a particular range of wavelengths. Housing 570 can form various shapes including, for example, a sphere. Housing 570 can also include aerodynamic features, such as, for example, dimples designed and/or arranged in a manner similar to a golf ball. In an embodiment including a plurality of smart chaff elements 550, different aerodynamic designs can be used to achieve a desired distribution that directs a missile away from the targeted vehicle.

In an exemplary embodiment, a plurality of smart chaff elements 550 can be used to protect an aircraft. The plurality of near-infrared emitters 550 can be charged up to temperature during pre-flight, takeoff, and/or early portions of the flight. Upon detection of a missile, the plurality of smart chaff elements 550 can be deployed. In various embodiments, different aerodynamic feature designs can be used on the smart chaff elements and/or they can be released from different locations on the aircraft, so that they can achieve a desired distribution, for example, to emulate the profile of the rear of the aircraft. Once deployed, transmitting fibers 558 can transmit near-infrared radiation from near-infrared emitter 555 and emit the radiation in a manner that deflects the missile away from the aircraft and towards one or more of the smart chaff elements 550. In various embodiments, the mass, geometry, and material properties of the smart chaff elements can be selected to minimize potential damage to personnel, structures, and vehicles upon striking the ground. The analysis of damage potential of chaff elements is well-known for flares, and can be found in Environmental Impact Statement (EIS) for the Airspace Training Initiative, Appendix C, Characteristics of Flares, Shaw Air Force Base, South Carolina. Additional information can be found in Common Risk Criteria for National Test Ranges published by the Range Commanders Council at the US Army White Sands Missile Range in New Mexico. Damage potential for spherical objects can be adapted from hailstone damage analyses, such as Simulated Hail Damage and Impact Resistance Test Procedures for Roof Coverings and Membranes, V. Crenshaw et al, October 2000 presentation to the Roofing Industry Committee on Weather Issues Meeting, Dallas, Tex.

Figure 6:
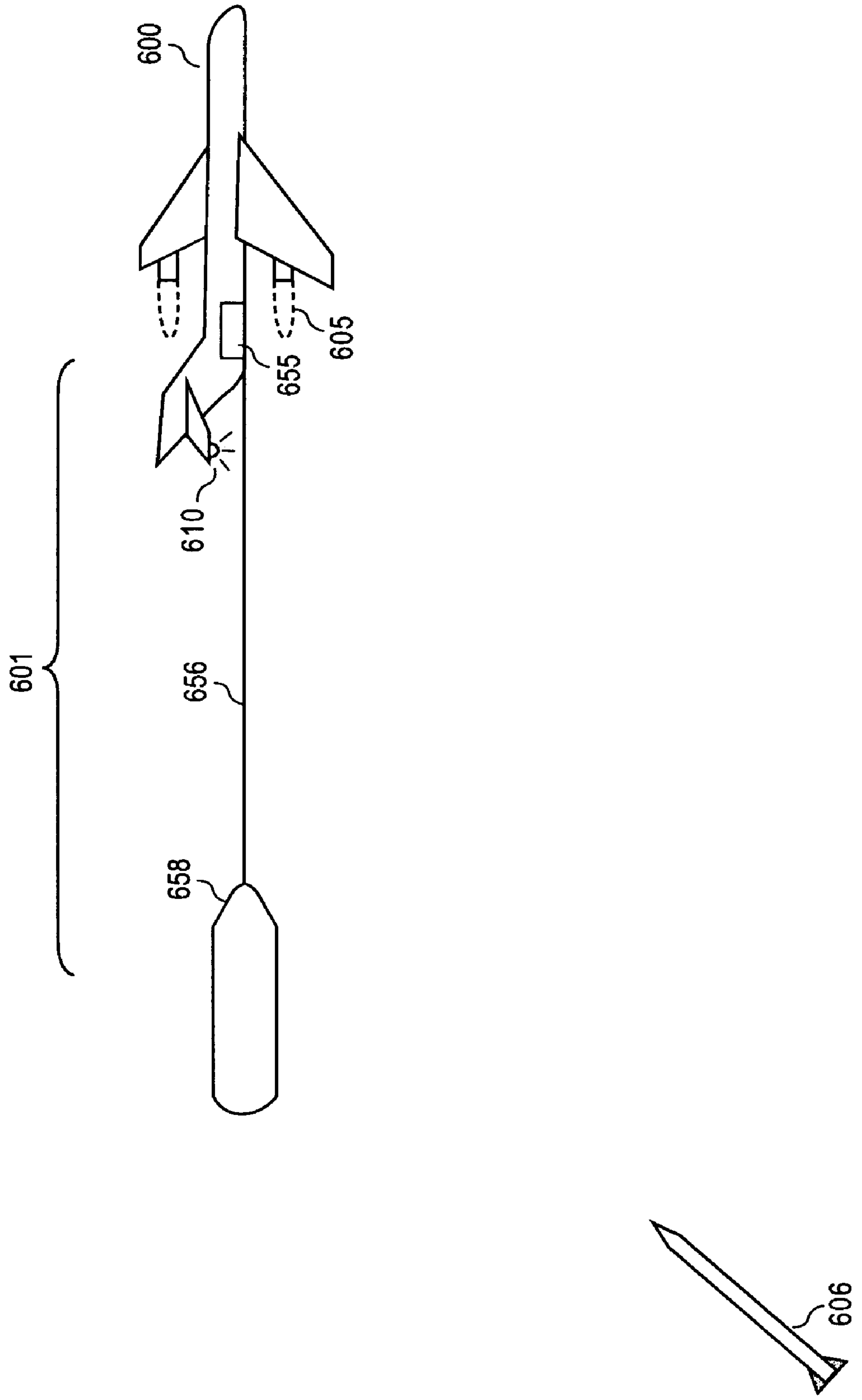
FIG. 6 illustrates yet another exemplary missile deflector system in accordance with the present teachings.

FIG. 6 depicts another exemplary embodiment of a missile deflector system in accordance with the present teachings. A missile deflector system 601 can include a UV light source 610, an infrared light source 655, a deployable optical conduit 656, and an optical element 658.

UV light source 610 can be configured to emit light in a direction coincident with at least a portion of an infrared radiation emitted by vehicle 600. For example, on the aircraft depicted in FIG. 6, UV light source 610 can be positioned on the tailfin of the aircraft to emit light coincident with emissions from the jet engines. In various other embodiments, one or more UV light sources 610 can be positioned under the wings to emit light that is coincident with infrared radiation emitted from the jets and/or the under surface of vehicle 600. Examples of UV light sources include, but are not limited to, xenon lamps, deuterium lamps, and mercury vapor lamps.

Infrared light source 655 can be located within vehicle 600. Light source 655 can be one or more infrared light lamps, such as, for example, xenon arc lamps or laser diodes. A first end of optical conduit 656 can be configured to capture light from infrared light source 555. Optical conduit 656 can be one or more optical fibers and be a glass, crystalline or hollow type optical fiber. Example of glass optical fibers include, but are not limited to, heavy metal fluoride (e.g., $ZrF_4$—$BaF_2$—$LaF_3$—$AlF_3$—NaF), germinate (e.g., $GeO_2$—PbO), and chalcogenide (e.g., $As_2S_3$ and AsGeTeSe) fibers. Examples of crystalline optical fibers include, but are not limited to, polycrystalline (e.g., AgBrCl) and single crystalline (e.g., sapphire). Examples of hollow optical fibers include, but are not limited to, hollow glass fibers and hollow sapphire fibers.

Optical element 658 can be disposed at the second end of optical conduit 656. The length of optical conduit can vary, but should be of sufficient length to protect vehicle 600 from the explosion of missile 606. Optical element 558 can include, but are not limited to, one or more lenses, filters, prisms, or gratings. In various embodiments, optical element 658 can include a wavelength converter.

In operation, missile 606 is fired at vehicle 600. Missile 606 can lock onto, for example, vehicle exhaust 605. Upon detection of missile 106 by, for example, a sensor as disclosed herein, missile deflector system 601 can be deployed. Light source 610 can be activated to emit UV radiation and make it more difficult for missile 606 to distinguish vehicle 600 from sunlight and/or the surrounding sky. UV light source 610 can be activated and optical conduit 656 can be deployed. UV light from light source 610 can be coupled into the first end of optical conduit 556 and be transported to the second end. The UV light can then be coupled into optical element 658 and emitted. The emitted UV light can draw missile 106 to optical element 658 and away from vehicle 600. After the explosion of missile 106, additional length of optical conduit 656 can be deployed to draw additional missiles away from vehicle 600.

Optical conduit 656 can transport a wavelength of radiation sought by missile 606, for example, 2-6 microns or 3-5 microns. In various embodiments, optical element 658 can include a wavelength converter to emit a shorter wavelength than was transmitted.

Other embodiments of the invention will be apparent to those skilled in the art from consideration of the specification and practice of the invention disclosed herein. For example, both tethered and untethered chaff elements can be deployed in a predetermined time relation. It is intended that the specification and examples be considered as exemplary only, with a true scope and spirit of the invention being indicated by the following claims.

What is claimed is:

1. A missile deflector system for use on a vehicle comprising:
- a light source attached to the vehicle, wherein the light source emits ultraviolet light in a direction coincident with at least a portion of an infrared radiation emitted by the vehicle; and
- a deployable smart chaff element comprising:
  - at least one infrared light source whose spectral emittance is detectable by a missile,
  - an infrared light source driver,
  - an energy storage element,
  - a controller,
  - a partially infrared-transmissive aerodynamic structure surrounding the infrared light source, and
  - at least one aerodynamic feature for stabilization.

2. The missile deflector system of claim 1, further comprising a communications system that allows the deployable smart chaff element to communicate with the vehicle.

3. The missile deflector system of claim 1, wherein the communications system communicates with a plurality of smart chaff elements.

4. The missile deflector system of claim 1 wherein the at least one infrared light source emits light with wavelengths between about 2 microns and about 6 microns.

5. The missile deflector system of claim 1, wherein the aerodynamic feature for stabilization comprises one of a chute, a fin, and a spinning feature.

6. The missile deflector system of claim 5, wherein the aerodynamic feature for stabilization is actively controlled.

7. The missile deflector system of claim 1, further comprising one or more optical elements disposed adjacent to the at least one infrared light source.

8. The missile deflector system of claim 7, wherein the one or more optical elements modifies at least one of an intensity, a relative spectral distribution, and a direction of an output of the at least one infrared light source.

9. The missile deflector system of claim 1, further comprising a sensor.

10. The missile deflector system of claim 9, wherein the sensor is one of a passive electromagnetic sensor, an active electromagnetic sensor, a timer, a position sensor, and an air data sensor.

11. The missile deflector system of claim 1, further comprising an offensive system to disable the missile.

12. The missile deflector system of claim 1, further comprising an energy generation system that converts kinetic energy into electrical energy.

13. A missile deflector system for a vehicle that emits an infrared radiation detectable by a missile comprising:
- an ultraviolent light source disposed on the vehicle, wherein the ultraviolet light source is emits light in a direction coincident with a portion of the infrared radiation emitted by the vehicle;
- an infrared light source disposed within the vehicle;
- a deployable optical conduit having a first end configured to couple light from the infrared light source; and
- an optical element disposed at a second end of the optical conduit, wherein the optical element emits light to draw the missile.

14. The missile deflector system of claim 13, wherein the emitted infrared light has a wavelength between about 2 microns and about 6 microns.

15. The missile deflector system of claim 13, further comprising an optical system that projects and image.

16. The missile deflector system of claim 15, wherein the image is one of a retroreflection of the missile and a projected image of a portion of a vehicle.

17. The missile deflector system of claim 15, wherein the optical system modifies one or more of the spectral intensity and the spatial characteristics of the image to emulate the missile's target.

18. The missile deflector system of claim 17, wherein the spatial characteristics are modified to adjust the image to emulate a profile of the vehicle.

19. The missile deflector system of claim 15, wherein the image emulates a blockage of sky irradiance by the vehicle.

20. A missile deflector system for a vehicle that emits an infrared radiation detectable by a missile comprising:
- a housing comprising aerodynamic features;
- a near-infrared emitter disposed within the housing;

a plurality of transmitting fibers, wherein a first end of the transmitting fibers is coupled to the near-infrared emitter; and an insulating material disposed around the near-infrared emitter.

21. The missile deflector system of claim 20, further comprising an optical element coupled to a second end of each of the plurality of transmitting fibers.

22. The missile deflector system of claim 20, wherein the aerodynamic features are dimples in a surface of the housing.

23. The missile deflector system of claim 20, wherein the transmitting fibers are doped.

24. The missile deflector system of claim 20, further comprising a conductive probe, wherein the conductive probe is connected to the near-infrared emitter and a heat source disposed within the vehicle.

* * * * *